United States Patent [19]

Watson

[11] 3,999,619

[45] Dec. 28, 1976

[54] CORE BARREL

[75] Inventor: John V. Watson, Fort Worth, Tex.

[73] Assignee: Watson, Incorporated, Fort Worth, Tex.

[22] Filed: May 30, 1975

[21] Appl. No.: 582,451

[52] U.S. Cl. .............................. 175/403; 175/410; 175/413

[51] Int. Cl.² ...................... E21B 9/16; E21C 13/02

[58] Field of Search .......... 175/171, 262, 379, 403, 175/404, 405, 410, 413; 299/79, 91–93; 37/142 R, 142 P, 141 R, 141 T; 125/20

[56] References Cited

UNITED STATES PATENTS

| 923,514 | 6/1901 | Hardsocg | 175/413 X |
|---|---|---|---|
| 1,114,505 | 10/1914 | Moore | 175/403 X |
| 1,168,226 | 1/1916 | Rand | 175/413 X |
| 1,813,375 | 7/1931 | Wright et al. | 175/413 X |
| 2,213,498 | 9/1940 | Kinzbach | 175/410 X |
| 2,285,039 | 6/1942 | Lowe | 37/141 R |
| 2,562,841 | 7/1951 | Compton | 175/404 X |
| 2,599,770 | 6/1952 | Marcerou | 175/410 X |
| 2,741,462 | 4/1956 | Baca | 175/404 |
| 2,896,405 | 1/1959 | Wolfe | 408/233 |
| 3,308,689 | 3/1967 | MacDonald | 408/204 |
| 3,351,998 | 11/1967 | Theiler | 29/105 |
| 3,491,844 | 1/1970 | Kelly, Jr. | 175/403 |
| 3,610,768 | 10/1971 | Cochran | 408/204 |
| R24,503 | 7/1958 | Compton | 175/404 X |

FOREIGN PATENTS OR APPLICATIONS 1,206,380 12/1965 Germany .............................. 299/91

Primary Examiner—Ernest R. Purser
Assistant Examiner—Richard E. Favreau
Attorney, Agent, or Firm—Richards, Harris and Medlock

[57] ABSTRACT

A core barrel comprises an elongate hollow cylinder having a substantially uniform diameter throughout its length and having apparatus at one end thereof for connection to a kelly. The opposite end of the core barrel cylinder is provided with a plurality of circumferentially spaced apart tooth receiving notches each rectangular in shape and characterized by opposed edges spaced apart a predetermined distance. A core barrel tooth is received in each of the notches of the cylinder, and each tooth comprises a tooth body having spaced apart surfaces which engage the opposed edges of the notch. Bifurcations extend from the tooth body of each core barrel tooth along the inner and outer surfaces of the core barrel cylinder. Aligned holes are formed through the bifurcations of each tooth and through the portion of the cylinder extending therebetween, and roll pins are utilized to secure the core barrel teeth in the tooth receiving notches of the core barrel cylinder. Each core barrel tooth further comprises a carbide cutting tip which is secured in a notch formed in the tooth body.

17 Claims, 7 Drawing Figures

CORE BARREL

BACKGROUND AND SUMMARY OF THE INVENTION

This invention relates to core barrels, and more particularly to improvements in core barrel teeth and the installation thereof.

In the fabrication of drilled shafts, hard materials such as rock are often removed by means of core barrels. Such a device comprises a hollow cylinder of uniform diameter throughout its length. In some instances the upper and lower portions of the cylinder are formed from different materials, with the lower portion comprising a wear-resistant material. A series of cutting teeth are typically provided around the lower edge of the cylinder comprising the core barrel. Apparatus is provided at the upper end of the core barrel for attaching the device to a kelly which functions both to rotate the core barrel and to control its vertical positioning.

In the use of a core barrel, the kelly is actuated first to position the lower end of the core barrel and the cutting teeth thereon in engagement with the materials to be cored or cut, and then to rotate the core barrel. By this means there is formed a circular slot or kerf surrounding the material to be removed. As the formation of the circular kerf continues, the material to be removed advances into the interior of the core barrel in the form of a cylinder. Then, when a layer of relatively weak material is encountered, the cylinder of hard material shears away from the underlying structure and rotates with the core barrel under the action of the kelly. At this point the kelly may be actuated to remove the core barrel and the cylinder of hard materials contained therein from the drilled shaft that is being fabricated. Typically the fines and other small pieces of hard material which are present within the core barrel as a result of the cutting operation are sufficient to frictionally and mechanically retain the cylinder within the core barrel as it is removed from the drilled shaft.

One problem that has been involved in the use of the core barrels available heretofore relates to the construction and installation of core barrel teeth. Typically, two types of core barrel teeth have been provided. In accordance with one procedure core barrel teeth are built upon the lower end of the core barrel cylinder utilizing lengths of hard material which are secured to the core barrel cylinder by means of braizing or welding techniques. This has proven to be unsatisfactory because the teeth are difficult and time consuming to replace in the field.

In accordance with the other conventional technique for providing core barrel teeth, a plurality of tooth retaining pockets are welded to the lower end of the core barrel cylinder. A plurality of teeth are also provided, with each tooth comprising a metal body having a tip formed from carbide or other hard materials secured thereto and having an attachment lug extending from one end. The attachment lug is received in the tooth retaining pocket and is secured therein by means of a fastener. This technique has also proved to be inadequate under field conditions primarily due to breakage which can occur either at the point of connection of the tooth retaining pocket to the core barrel cylinder or at the point of connection of the retaining lug to the body.

The present invention relates to improvements in core barrel teeth and the installation thereof which overcome the foregoing and other problems long since associated with the prior art. In accordance with the broader aspects of the invention, a core barrel tooth comprises a body having bifurcations extending from one end thereof which are spaced apart to receive the opposite ends of the cylinder of a core barrel. The lower end of the core barrel cylinder is in turn provided with a plurality of notches each having edges positioned to engage the forward and rearward end surfaces of the tooth body of one of the core barrel teeth. In this manner there is formed between each core barrel tooth and the core barrel cylinder a connection which is very strong and rigid in the direction of applied force.

In accordance with more specific aspects of the invention, the bifurcations of each core barrel tooth are provided with aligned apertures, and a roll pin is received through these apertures and through an aperture formed in the adjacent portion of the cylinder of the core barrel to retain the tooth in engagement with the core barrel cylinder. In this manner the field replacement of worn core barrel teeth is facilitated. A tip formed from carbide or other hard material may be secured to the tooth body of each core barrel tooth by means of brazing or welding. The tip is preferably secured in a notch formed in the tooth body and has a generally rectangular shape which can extend to a pointed lower end.

DESCRIPTION OF THE DRAWINGS

A more complete understanding of the invention may be had by reference to the following Detailed Description when taken in conjunction with the accompanying drawings, wherein.

DETAILED DESCRIPTION

Figure 1:
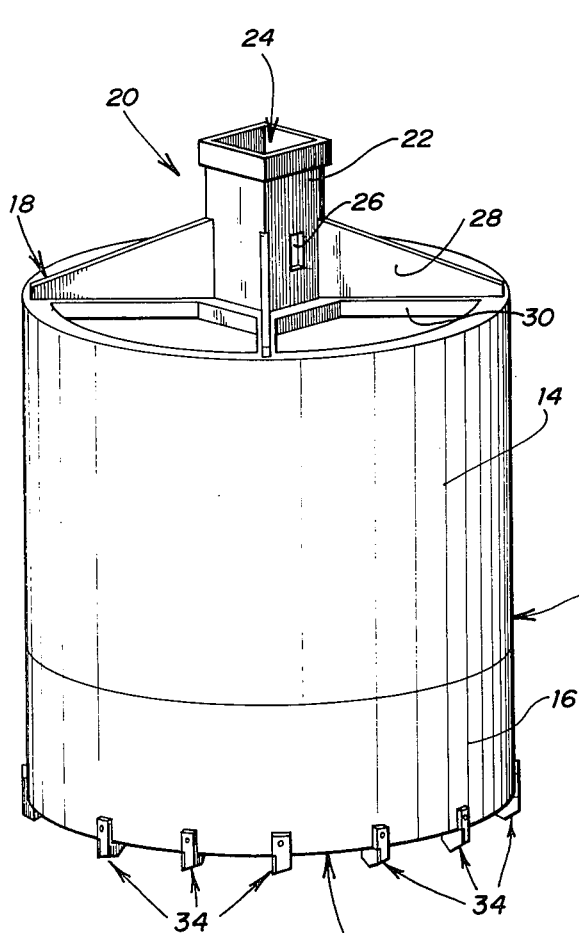
FIG. 1 is a perspective view of a core barrel incorporating the invention.

Referring now to the drawings, and particularly to FIG. 1 thereof, there is shown a core barrel 10 incorporating the present invention. The core barrel 10 includes a hollow cylinder 12 comprising a right circular cylinder which is of substantially uniform diameter throughout its length. The cylinder 12 is further characterized by a predetermined wall thickness which is also uniform throughout the length and the circumference of the cylinder.

If desired, the core barrel cylinder 12 may comprise a portion 14 formed from a relatively inexpensive material and a portion 16 formed from a relatively wear-resistant material. In such instances the portions 14 and 16 are joined end-to-end by means of welding. It will be understood that the core barrel cylinder 12 may also be formed from the same material throughout its length.

One end 18 of the core barrel cylinder 12 is provided with apparatus 20 for connecting the core barrel 10 to a kelly. The apparatus 20 includes a kelly box 22 having a square aperture 24 formed therein for receiving a kelly. The kelly box 22 has an aperture 26 formed therein, and the kelly has a mating aperture formed therein, whereby a fastener may be inserted through the aperture 26 to secure the core barrel 10 to the kelly. Thereafter, the kelly functions both to rotate and to control the vertical positioning of the core barrel 10. The kelly box 22 is secured to the core barrel cylinder 12 of the core barrel 10 by means of a plurality of flanges 28 and webs 30. The kelly box 22, the flanges 28, the webs 30 and the core barrel cylinder 12 are preferably rigidly interconnected by means of welding.

The core barrel cylinder 12 further comprises an end 32 remote from the end 18. The end 32 of the core barrel cylinder 12 is provided with a plurality of core barrel teeth 34 each incorporating the present invention. The core barrel teeth 34 are mounted at spaced apart points around the circumference of the end 32 of the core barrel cylinder 12. Preferably, the core barrel teeth 34 are mounted at unequal intervals around the circumference of the end 32 of the cylinder 12. This is to prevent "chatter" which is sometimes encountered when equal spacing is used.

It has been found that a convenient height for core barrels incorporating the invention may be between about 30 inches and about 36 inches. In such instances, the height of the portion 16 is preferably approximately 12 inches, and the height of the portion 14 is between about 18 inches and about 24 inches. A workable relationship between the diameter of the core barrel and the number of teeth 34 is as follows:

TABLE

| Diameter of Cylinder 12 | Number of Teeth 34 |
|---|---|
| 10 | 4 |
| 12 | 5 |
| 14 | 6 |
| 16 | 7 |
| 18 | 8 |
| 20 | 9 |
| 22 | 9 |
| 24 | 10 |
| 26 | 11 |
| 28 | 12 |
| 30 | 13 |
| 32 | 14 |
| 34 | 15 |
| 36 | 16 |
| 38 | 17 |
| 40 | 18 |
| 42 | 19 |
| 44 | 19 |
| 46 | 20 |
| 48 | 21 |
| 50 | 22 |
| 52 | 23 |
| 54 | 24 |
| 56 | 25 |
| 58 | 26 |
| 60 | 27 |
| 62 | 28 |
| 64 | 29 |
| 66 | 29 |
| 68 | 30 |
| 70 | 31 |
| 72 | 32 |

Figure 3:
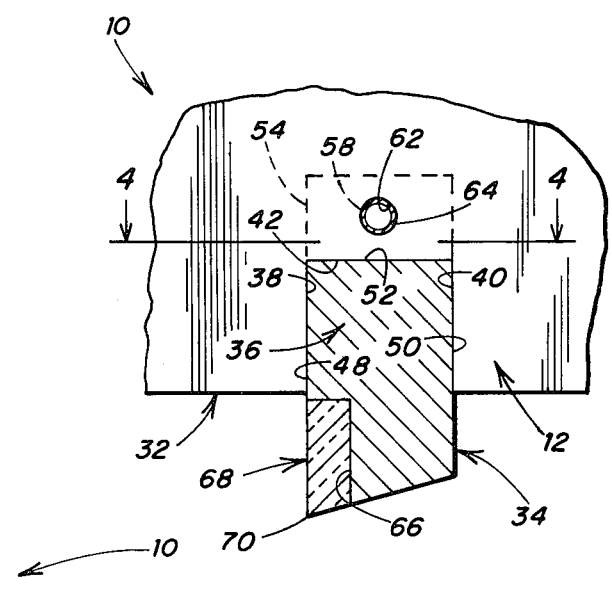
FIG. 3 is a sectional view further illustrating the invention.
Figure 2:
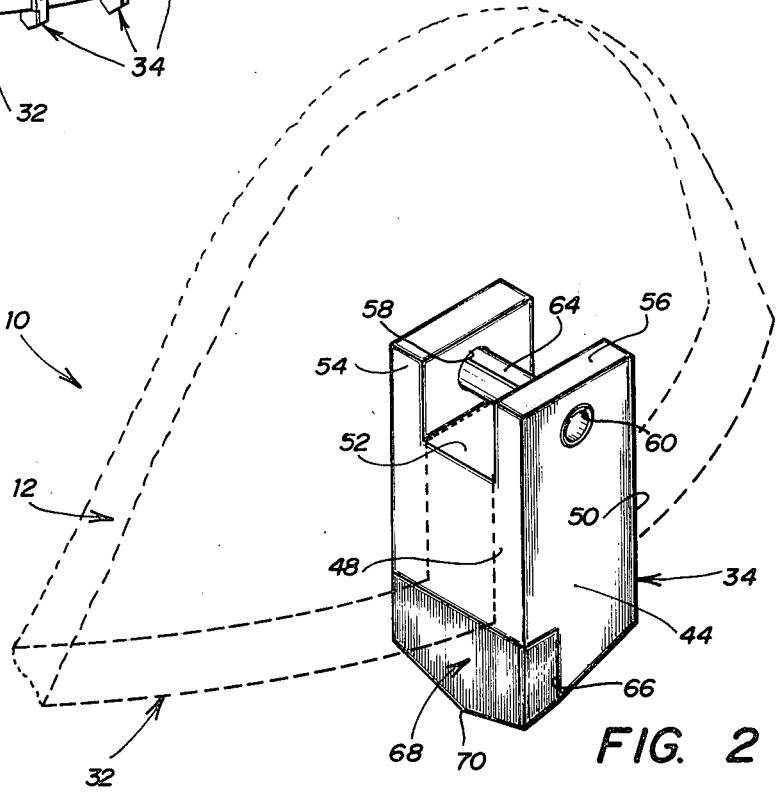
FIG. 2 is an enlarged view of the lower end of the core barrel of FIG. 1.

Referring now to FIGS. 2 and 3, the end 32 of the core barrel cylinder 12 of the core barrel 10 has a plurality of tooth receiving notches 36 formed therein. Each notch 36 comprises opposed edges 38 and 40 positioned a predetermined distance apart. A connecting edge 42 extends perpendicular to and between the edges 38 and 40.

Each of the notches 36 in the end 32 of the cylinder 12 receives one of the core barrel teeth 34. The notches 36 are preferably unequally spaced around the circumference of the end 32 of the cylinder 12, and the relationship of the number of notches 36 to the diameter of the cylinder 12 can be the same as that as set forth in the foregoing table.

Each tooth 34 comprises a tooth body 44 formed from a tough, substantially wear-resistant material, such as tool steel. The tooth body 44 of each tooth 34 is preferably fabricated by means of techniques which impart toughness, hardness, wear-resistance, rigidity, dimensional stability, and similar characteristics to the core barrel tooth 34. Preferably, the tooth body 44 is fabricated by means of investment casting or forging. The tooth body 44 may also be machined from solid stock, if desired.

The tooth body 44 is rectangular in cross section and comprises a pair of spaced apart surfaces 48 and 50. The surfaces 48 and 50 are spaced apart the same predetermined distance as the spacing between the edges 38 and 40 of the notch 36 which receives the tooth 34. Thus, when the tooth 34 is positioned in its respective notch 36, the surfaces 48 and 50 of the tooth body 44 engage the edges 38 and 40 of the notch 36. The tooth body 44 further comprises an end surface 52 which engages the connecting edge 42 of the notch 36 which receives the tooth 34.

Each core barrel tooth 34 further comprises bifurcations 54 and 56 extending from the tooth body beyond the surface 52. The bifurcations 54 and 56 are spaced apart by a predetermined distance which is substantially equal to the wall thickness of the core barrel cylinder 12. Thus, when the core barrel tooth 34 is positioned in its respective notch 36, the bifurcations 54 and 56 extend along and engage the inner and outer surfaces of the cylinder 12, respectively.

Figure 4:
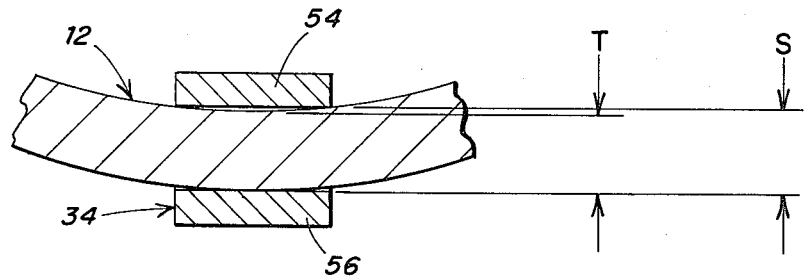
FIG. 4 is a sectional view taken generally along the line 4—4 in FIG. 3 in the direction of the arrows.

The relationship of the spacing between the bifurcations 54 and 56 of each core barrel tooth 34 and the wall thickness of the core barrel cylinder 12 is illustrated in FIG. 4. In FIG. 4, the curvature of the core barrel cylinder 12 is exaggerated for clarity. It will be noted that whereas the actual wall thickness of the core barrel cylinder 12 may be characterized by a dimension T, the spacing between the inner and outer surfaces of the bifurcations 54 and 56 is characterized by a somewhat larger dimension S. This is to account for the curvature of the core barrel cylinder 12. It will be understood, however, that in actual practice the difference between the dimension T and the dimension S is small, and that the dimension S is selected so that the bifurcations 54 and 56 actually engage the inner and outer surfaces of the core barrel cylinder 12.

The bifurcations 54 and 56 of each tooth 34 have a pair of aligned fastener receiving apertures 58 and 60 formed therein. The portion of the core barrel cylinder 12 extending between the bifurcations 54 and 56 has an aligned aperture 62 formed therethrough. A roll pin 64 is received through the apertures 58 and 60 and the aperture 62, and therefore serves to retain the tooth 34 in engagement with the cylinder 12 and within the notch 36 formed therein. It will be understood that fasteners other than roll pins may be utilized in the practice of the invention, if desired.

The end of the tooth body 44 of the core barrel tooth 34 remote from the bifurcations 54 and 56 comprises a notch 66. A cutting tip 68 formed from a hard, wear-resistant material is mounted in the notch 66 of the tooth body 44. For example, the cutting tip 68 may be formed from carbide. In such instances the cutting tip 68 is preferably retained in the notch 66 by means of welding or brazing.

The cutting tip 68 is substantially rectangular in shape and has a pointed end 70. An important feature of the present invention comprises the fact that the notch 66 of the tooth body 44 has substantially the same depth and substantially the same length as the cutting tip 68. This is highly advantageous in that the cutting tip 68 is supported throughout its entire length and is therefore not subject to breakage as might otherwise be the case.

Figure 7:
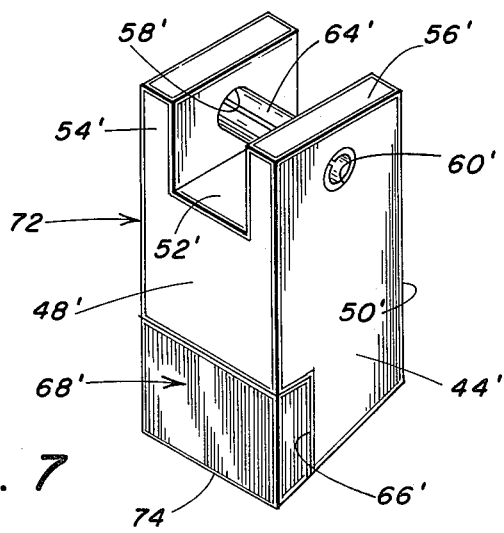
FIG. 7 is an illustration of an alternative tooth construction.

A core barrel tooth 72 comprising an alternative embodiment of the invention is illustrated in FIG. 7. Many of the component parts of the core barrel tooth 72 are substantially identical in construction and function to component parts of the core barrel tooth 34. Such identical component parts are designated in FIG. 7 with the same reference numerals utilized hereinbefore in the description of the core barrel tooth 34, but are differentiated therefrom by means of a prime (') designation.

The primary distinction between the core barrel tooth 72 and the core barrel tooth 34 resides in the fact that the cutting tip 68' of the core barrel tooth 72 does not extend to a pointed end. Rather, the cutting tip 68' comprises a flat or straight cutting edge 74. This construction is considered to be advantageous for use in conjunction with core barrel teeth intended for use in coring operations involving particular types of materials.

Figure 5:
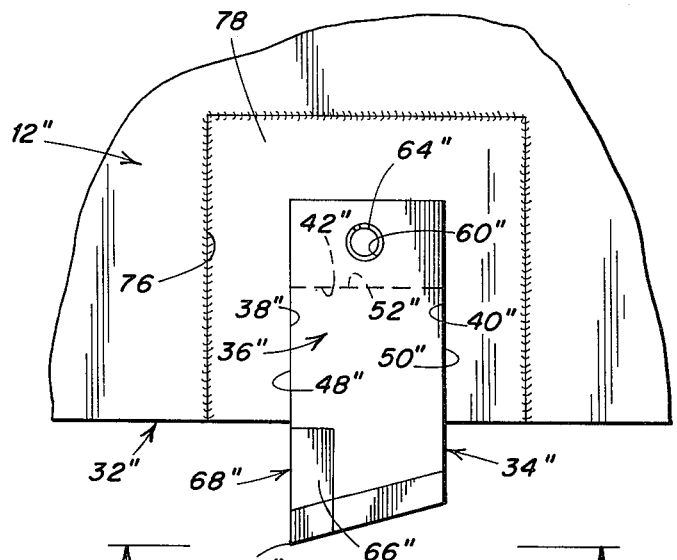
FIGS. 5 and 6 are illustrations of an alternative tooth mounting arrangement.
Figure 6:
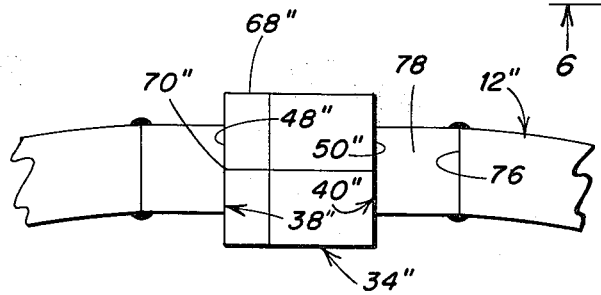

An alternative method of mounting core barrel teeth incorporating the present invention is illustrated in FIGS. 5 and 6. Many of the component parts shown in FIGS. 5 and 6 are substantially identical in construction and function to component parts of the core barrel 10 and the core barrel teeth 34. Such identical component parts are designated in FIGS. 5 and 6 with the same reference numerals utilized hereinbefore in the description of the core barrel 10 and the core barrel teeth 34, but are differentiated therefrom by means of a double prime (") designation. In this regard it will be understood that the tooth mounting arrangement of FIGS. 5 and 6 may be utilized to mount core barrel teeth of the type illustrated in FIG. 7 as well as other types of core barrel teeth incorporating the invention.

The primary distinction between the core barrel tooth mounting arrangement of FIGS. 5 and 6 and that of FIGS. 1-4 comprises the fact that the core barrel cylinder 12" is provided with a plurality of enlarged notches 76 each individual to one of the core barrel teeth 34". Each notch 76 receives therein a tooth holder 78 formed from tool steel, or the like. The tooth holder 78 is identical in shape and dimensions to the notch 76, and is secured therein by welding. Once mounted in the notch 76, the tooth holder 78 becomes part of the core barrel cylinder for all purposes.

Each notch 36" is in turn formed in one of the tooth holders 78. The relationship between the various surfaces comprising the notches 36" and the various surface comprising the core barrel teeth 34" is the same as that discussed above in connection with the notches 36 and the core barrel teeth 34. It will therefore be understood that the core barrel teeth 34" are retained in engagement with the tooth holder 78 and are therefore retained in engagement with the core barrel cylinder 12" in exactly the same manner as that in which the core barrel teeth 34 are retained in engagement with the core barrel cylinder 12.

One advantage deriving from the use of the core barrel tooth mounting arrangement of FIGS. 5 and 6 is best illustrated in FIG. 6. It will be noted that whereas the inner and outer surfaces of the core barrel cylinder 12" are curved, the inner and outer surfaces of the tooth holder 78 may be straight or planar. In such instances the difference between the dimension T and the dimension S as illustrated in FIG. 4 is eliminated.

Another advantage deriving from the tooth mounting arrangement of FIGS. 5 and 6 involves core barrels which are adapted in the field to receive core barrel teeth incorporating the present invention. In such instances the tooth holders 78 may be fabricated at a factory utilizing manufacturing processes designed to control the dimensions of the notches 36" to a high degree of tolerance. The notches 76 may then be formed in the field utilizing cutting techniques which cannot maintain tolerances of the type required for the notches 36". Any difference between the dimensions of the notches 76 and those of the tooth holder 78 resulting from such field cutting techniques may then be accommodated during the welding of the tooth holders 78 into the notches 76.

In the use of a core barrel incorporating the present invention, the core barrel is first secured to the kelly of a drilling machine. This is accomplished by positioning the kelly in the kelly box of the core barrel, and then inserting a fastener through the aperture in the kelly box and the aligned aperture in the kelly. Thereafter, the drilling machine functions through the kelly to first engage the end of the core barrel cylinder with the surface of a body of hard material to be cored, and thereafter to rotate the core barrel.

Upon engagement with and rotation relative to the hard material to be drilled, the core barrel teeth of the core barrel form a circular slot or kerf in the hard material. As the formation of the circular kerf progresses, a cylinder of the hard material advances into the interior of the core barrel cylinder. Thereafter, when a layer of relatively soft or weak material is encountered in the hard material, the cylinder of hard material commences to rotate with the core barrel. At this point the drilling machine operates through the kelly to remove the core barrel and the cylinder of hard material contained therein from the hole being drilled. Typically, the fines formed during the cutting operation and other loose materials contained within the core barrel cylinder are adequate to frictionally and mechanically retain the cylinder of hard material therein as it is withdrawn from the hole being formed.

As the use of the core barrel progresses, the core barrel teeth thereof will eventually become worn. At this point the roll pins are removed and the core barrel teeth are then removed from the tooth receiving notches. New or rebuilt core barrel teeth are then positioned in the notches and are secured by means of the roll pins. The core barrel is then returned to service.

From the foregoing, it will be understood that the present invention comprises numerous advantages over the prior art. Perhaps the most important advantage deriving from the use of the invention involves the fact that by means thereof core barrel teeth are securely and firmly retained in engagement with a core barrel cylinder and yet are quickly and easily replaced after they have become worn. Another advantage deriving from the use of the invention involves the very rigid manner in which core barrel teeth constructed in accordance therewith are retained in engagement with a core barrel cylinder. This has been found to substantially reduce incidents of breakage, and thereby eliminates a problem which has long since been associated with the prior art. Still another advantage deriving from the use of the invention involves the fact that core barrel teeth constructed in accordance therewith are adapted for fabrication by means of either investment casting or forging, and are therefore economical to manufacture and use. Other advantages in the use of the invention will readily suggest themselves to those skilled in the art.

Although preferred embodiments of the invention have been illustrated in the accompanying Drawings and described in the foregoing Detailed Description, it will be understood that the invention is not limited to the embodiments disclosed, but is capable of rearrangement, modification and substitution of parts and elements without departing from the spirit of the invention.

What is claimed is:

1. A core barrel comprising:
an elongate, hollow cylinder having a substantially uniform diameter throughout its length and having a predetermined wall thickness;
means mounted adjacent one end of the cylinder for securing the core barrel to a kelly;
a plurality of tooth receiving notches positioned at spaced apart points around the circumference of the cylinder at the opposite end thereof from the kelly securing means;
each of said notches being substantially rectangular in shape and characterized by opposed edges spaced apart a predetermined distance;
a plurality of core barrel teeth each mounted in one of the tooth receiving notches;
each of the core barrel teeth comprising a tooth body having opposed, substantially parallel end surfaces spaced apart the same predetermined distance as the predetermined distance between the opposed edges of the tooth receiving notches of the core barrel cylinder and engaging the opposed edges of one of the notches, and opposed, spaced apart, substantially parallel side surfaces each extending continuously along the entire length of the core barrel tooth;
the distance between the opposed end surfaces of the tooth body being at least as great as the distance between the opposed side surfaces thereof;
each of said core barrel teeth further comprising bifurcations extending from the tooth body along the inner and outer surfaces of the core barrel cylinder;
said bifurcations comprising extensions of the tooth body and having common end and side surfaces therewith;
the bifurcations of each core barrel tooth being separated by a slot substantially equal in width to the wall thickness of the core barrel cylinder;
each of said end surfaces and each of said side surfaces of the tooth body of each tooth extending to a bottom surface which extends angularly downwardly from the rearward end surface to the forward end surface.

2. The core barrel according to claim 1 further characterized by aligned fastener receiving apertures formed through the bifurcations of each tooth and through the portion of the core barrel cylinder received therebetween, and fastener means extending through the fastener receiving apertures of each tooth and the core barrel cylinder to retain the tooth in engagement with the cylinder.

3. The core barrel according to claim 1 wherein each of the notches formed in the core barrel cylinder is further characterized by a connecting edge extending between the opposed edges, and wherein the bifurcations of each core barrel tooth extend to a surface on the tooth body which engages the connecting surface of the notch of the core barrel cylinder.

4. The core barrel according to claim 1 wherein the tooth body of each core barrel tooth comprises a relatively tough material, and wherein each core barrel tooth further comprises a tip formed from a relatively hard, wear resistant material and secured to the tooth body.

5. The core barrel according to claim 4 wherein the cutting tip of each core barrel tooth is generally rectangular in shape and extends to a relatively pointed end.

6. The core barrel according to claim 4 wherein the cutting tip of each core barrel tooth is generally rectangular in shape and extends to a flat end.

7. A core barrel comprising:
an elongate, hollow cylinder having a substantially uniform diameter throughout its length;
means mounted adjacent one end of the cylinder for securing the core barrel to a kelly;
a plurality of tooth receiving notches positioned at spaced apart points around the circumference of the cylinder at the opposite end thereof from the kelly securing means;
each of said notches being substantially rectangular in shape and characterized by opposed edges spaced apart a predetermined distance;
a plurality of core barrel teeth each mounted in one of the tooth receiving notches;
each of the core barrel teeth comprising a tooth body having end surfaces spaced apart the predetermined distance and engaging the opposed edges of one of the notches;
each of said core barrel teeth further comprising bifurcations extending from the tooth body along the inner and outer surfaces of the core barrel cylinder;
the bifurcations of each core barrel tooth being spaced apart by a distance substantially equal to the wall thickness of the core barrel cylinder;
said core barrel further comprising a plurality of relatively large notches formed therein each corresponding to one of the core barrel teeth; and
a plurality of tooth holders each secured in one of the large notches and each having one of the tooth receiving notches formed therein.

8. For use in conjunction with a core barrel having a predetermined wall thickness and having a plurality of rectangular tooth receiving notches each characterized by opposed edges spaced apart a predetermined distance, a core barrel tooth comprising:
a tooth body having a rectangular cross section characterized by opposed, spaced apart, substantially parallel end surfaces spaced the same predetermined distance apart as the predetermined distance between the opposed edges of the tooth receiving notches of the core barrel, and opposed, spaced apart, substantially parallel side surfaces each extending continuously along the entire length of the core barrel tooth, said tooth body being formed from a relatively tough material;

the distance between the opposed end surfaces of the tooth body being at least as great as the distance between the opposed side surfaces thereof;

bifurcations extending from one end of the tooth body and separated by a slot which is at least equal in width to the predetermined wall thickness of the core barrel;

said bifurcations comprising extensions of the tooth body and having common end and side surfaces therewith;

aligned fastener receiving apertures formed through the bifurcations at a point substantially displaced from the point of connection of the tooth body thereto; and a cutting tip formed from a relatively hard, wear-resistant material and secured to the tooth body at the end thereof remote from the bifurcations.

9. The core barrel tooth according to claim 8 wherein the tooth body is further characterized by a notch having the cutting tip mounted therein and supporting the cutting tip throughout substantially its entire length.

10. The core barrel tooth according to claim 8 wherein the tooth body and the bifurcations are formed from steel and the cutting tip is formed from carbide.

11. The core barrel tooth according to claim 8 wherein the cutting tip extends to a pointed end.

12. The core barrel tooth according to claim 8 wherein the cutting tip extends to a flat end.

13. A core barrel comprising:

a hollow cylinder having a substantially uniform diameter throughout its length and having a predetermined wall thickness;

means positioned at one end of the core barrel cylinder for connecting the core barrel to a kelly;

the opposite end of the cylinder having a plurality of relatively large notches formed therein at spaced apart points around the circumference of the cylinder;

a tool holder positioned in each of the relatively large notches of the core barrel cylinder and secured thereto;

each of the tool holders having a tooth receiving notch formed therein characterized by opposed edges spaced a predetermined distance apart and a connecting edge extending between the opposed edges;

a plurality of core barrel teeth each mounted in one of the tooth receiving notches;

each of said core barrel teeth comprising a tooth body characterized by opposed surfaces positioned the predetermined distance apart and engaging the opposed edges of the tooth receiving notch and an end surface engaging the connecting edge of the tooth receiving notch;

each of the core barrel teeth further comprising bifurcations extending from the tooth body along the inner and outer surfaces of the tooth holder and being spaced apart by a predetermined distance substantially identical to the wall thickness of the tooth holder;

the bifurcations of each tooth and the portion of the tooth holder extending therebetween having aligned fastener receiving apertures formed therethrough;

a plurality of fasteners each extending through the aligned fastener receiving apertures in the bifurcations of one of the core barrel teeth and the portion of the tooth holder received therebetween to secure the core barrel tooth to the tooth holder;

each of the core barrel teeth further comprising a cutting tip formed from a relatively hard, wear resistant material and secured to the tooth body.

14. The core barrel according to claim 13 wherein the fastener means comprises roll pins.

15. The core barrel according to claim 13 wherein the tooth body and the bifurcations of each core barrel tooth are formed from steel, and wherein the cutting tip of each core barrel tooth is formed from carbide and comprises a generally rectangular configuration.

16. The core barrel according to claim 15 wherein each cutting tip extends to a pointed end.

17. The core barrel according to claim 15 wherein each cutting tip extends to a flat end.

* * * * *